United States Patent [19]

Oshima

[11] 4,372,663
[45] Feb. 8, 1983

[54] REAR APERTURE CONVERTER

[75] Inventor: Fumio Oshima, Shiki, Japan

[73] Assignee: Asahi Kogaku Kogyo Kabushiki Kaisha, Tokyo, Japan

[21] Appl. No.: 285,917

[22] Filed: Jul. 23, 1981

[30] Foreign Application Priority Data

Jul. 31, 1980 [JP] Japan .................. 55-108650[U]

[51] Int. Cl.³ .................. G03B 17/14; G03B 7/20; G02B 7/02
[52] U.S. Cl. .................. 354/286; 354/289; 354/23 D; 350/257
[58] Field of Search ........... 354/23 D, 46, 60 R, 354/286, 289, 295, 296; 350/252, 257, 37-39

[56] References Cited

U.S. PATENT DOCUMENTS 3,879,741  4/1975  Saito et al. .................. 354/46
4,118,713  10/1978  Murakami et al. .................. 354/286 X Primary Examiner—William B. Perkey
Attorney, Agent, or Firm—Christie, Parker & Hale

[57] ABSTRACT

A photographic camera has an interchangeable lens assembly with a lens mount and a camera body with a body mount engageable with the lens mount, a source of binary signals with at least two bits representative of the minimum aperture value in the lens assembly, and a mechanism in the camera body for receiving the binary information. A rear aperture converter has a first mount engageable with the lens mount and a second mount engageable with the body mount. One bit of the binary information is transmitted from the first mount to the second mount without change. The other bit of the binary information is transmitted from the first mount to the second mount in inverted form.

2 Claims, 3 Drawing Figures

REAR APERTURE CONVERTER

BACKGROUND OF THE INVENTION

The present invention relates to a rear aperture converter and, more particularly, a rear aperture converter that compensates for changes in lens information due to its insertion.

In a photographic camera adapted to transmit lens aperture information for automatic exposure from the objective to the camera body by electric contacts arranged on a lens mount and a camera body mount, respectively, a change in said lens aperture information occurs due to insertion of a rear aperture converter. It is desirable to compensate for this change and to transmit the information compensated to the camera body without any special adjustment, although inserting the rear aperture converter between the objective and the camera body multiplies the effective aperture ratio.

When a rear aperture converter having a conversion ratio of 2 is used, the effective maximum aperture in F-value and minimum aperture in F-value are doubled with respect to the corresponding values peculiar to the objective itself, so that a direct transmission of aperture value signals from the objective to the camera body would make it impossible to achieve accurate exposure control and to display the effective aperture value associated with the automatic exposure. To solve this problem, a lever could be provided which is operatively associated with the diaphragm mechanism for regulation of the lens aperture value from the camera body; the lever would be displaced within the rear aperture converter by an amount corresponding to the change caused by the rear aperture converter. However, this would result in an extension of the range in which said lever operates and the mechanical displacement of the lever would lead not only to complication of the overall mechanism but also to low precision and reliability.

SUMMARY OF THE INVENTION

In the case of a photographic camera in which the lens aperture information for automatic exposure is electrically transmitted from the objective to the camera body, the invention compensates electrically for the influence of the rear aperture converter inserted between the objective and the camera body on the minimum aperture value signal (Fmin signal). Especially in transmission of an Fmin signal via a rear aperture converter having a conversion ratio of 2 and a pair of pins, the number of contacts to be arranged within the converter can be advantageously reduced according to the invention to improve the reliability as well as simplification of manufacturing. Specifically, a photographic camera has an interchangeable lens assembly with a lens mount and a camera body with a body mount engageable with the lens mount, a source of binary signals with at least two bits representative of the minimum aperture value in the lens assembly, and a mechanism in the camera body for receiving the binary information. A rear aperture converter has a first mount engageable with the lens mount and a second mount engageable with the body mount. One bit of the binary information is transmitted from the first mount to the second mount without change. The other bit of the binary information is transmitted from the first mount to the second mount in inverted form. Thus, the rear aperture converter itself automatically compensates for the change in a lens characteristic, specifically, the minimum aperture value, it introduces.

BRIEF DESCRIPTION OF THE DRAWING

The features of specific embodiments of the best mode contemplated of carrying out the invention are illustrated in the drawing, in which.

DETAIL DESCRIPTION OF THE SPECIFIC EMBODIMENTS

Table 1 indicates how the minimum aperture in F-value (Fmin) of the objective itself and the signal outputs from the a- and b-pins corresponding to said Fmin should be modified when a rear aperture converter having the conversion ratio of 2 has been inserted. As an example, the case of Fmin 16 will be considered. Without a rear aperture converter, ON signals appear as outputs from both the a-pin and the b-pin of this objective. Once a rear aperture converter having the conversion ratio of 2 has been inserted between the objective and the camera body, Fmin 16 is converted into an effective combined Fmin of 32 and the signal outputs corresponding to the aperture value should be OFF at the a-pin and ON at the b-pin. Table 1 contains no description of the cases in which the effective combined Fmin excesses 45, since practically no photographing takes place in such a dark condition. For a rear aperture converter having its specific conversion ratio of 2, the electric contact pins may be arranged so as to provide doubled Fmin as the combined Fmin. Accordingly, it will be readily understood from Table 1 that in this case the ON signal at the a-pin should be replaced by the OFF signal and the signal at the b-pin may be directly transmitted to the camera body. As for the rear aperture converter itself, the converter need not have any provision on its own mount adjacent the objective at a position corresponding to said a-pin and, at the corresponding position on its own mount adjacent the camera body, may have an insulator or a counter bore to make the signal input terminal on the camera body OFF. With respect to the b-pin, the rear aperture converter may have both on its mount adjacent the objective and its mount adjacent the camera body at positions corresponding to said b-pin, respectively, contacts cooperating with the b-pin so that the signal at this b-pin is directly transmitted to the camera body.

Figure 1:
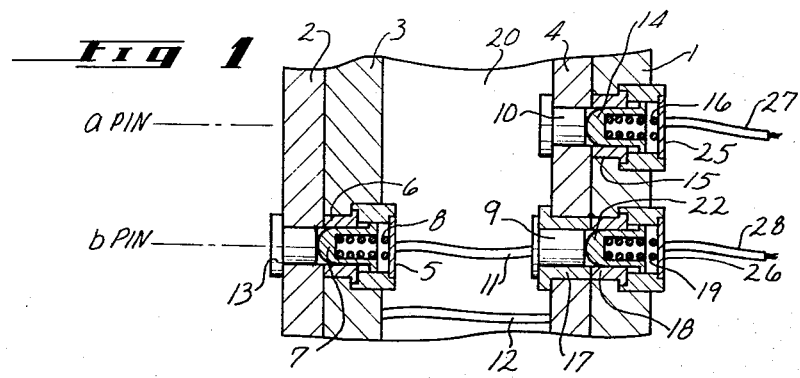
FIG. 1 is a sectional view of a portion of a lens assembly, a portion of a camera body, and a rear aperture converter inserted therebetween which incorporates the principles of the invention.
Figure 2:
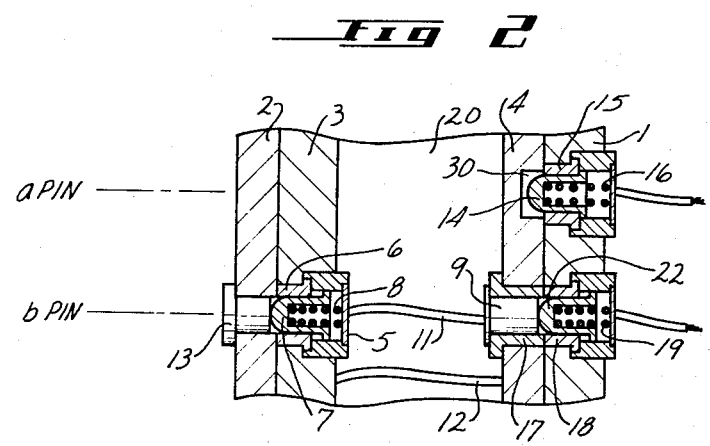
FIG. 2 is a sectional view of an alternative embodiment of a rear aperture converter incorporating the principles of the invention.
Figure 3:
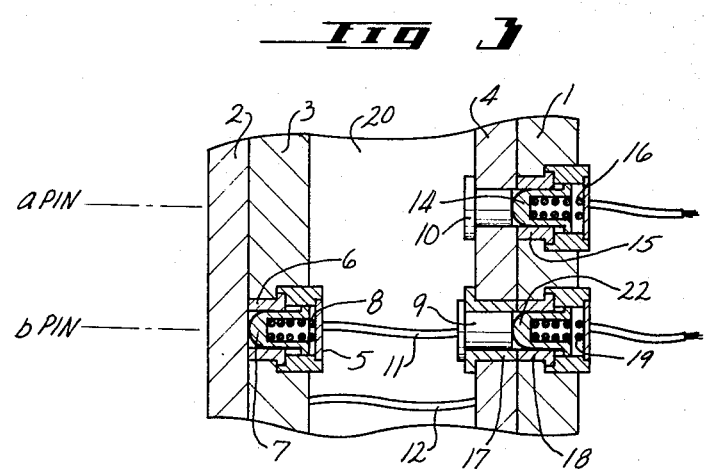
FIG. 3 is a sectional view of the rear aperture converter of FIG. 1 inserted between a different lens assembly and the camera body.

An embodiment of the present invention is illustrated by FIGS. 1 to 3, in which identical reference numerals designate identical parts, respectively. A mount 3 of a rear aperture converter adjacent the objective and a mount 4 thereof adjacent the camera body both made of conductive material are fixed to a rear aperture converter body 20 made of insulating material so that mounts 3 and 4 are electrically connected with a lens mount 2 and a body mount 1, respectively, through surface contact therewith. Mounts 1 and 2 are mechanically engageable, mount 4 is engageable with mount 1, and mount 3 is engageable with mount 2. Typically, mounts 1 through 4 are bayonet-type mounts of the type disclosed in application Ser. No. 237,986. Thus, the objective can be directly mounted on the camera body or the rear aperture converter can be inserted between the objective and the camera body. The mount 3 adjacent the objective is electrically connected by a lead wire 12 with mount 4 adjacent the camera body. FIGS. 1 and 2 correspond to the case in which a rear aperture converter having a conversion ratio of 2 is inserted between an objective having its own Fmin of 22 (a-pin; ON, b-pin; OFF) and the camera body to obtain a combined Fmin of 45 (a-pin; OFF, b-pin; OFF), as shown by Table 1. It will be understood that at mount 2 nothing is provided at the a-pin position corresponds to the ON signal while an insulator 13 occupying the b-pin position corresponds to the OFF signal. There is provided nothing at the position of rear aperture converter mount 3 adjacent the objective corresponding to the a-pin position and there is provided at a position thereof corresponding to the b-pin position an electrical contact pin 7 projecting against insulator 13 under a biasing effect of a conductive spring 8. Contact pin 7 is electrically insulated from mount 3 by an insulating collar 6 and is electrically connected by spring 8 with a conductive base plate 5. An electrical contact pin 14 projects toward mount 4 at the a-pin position under a biasing effect of a conductive spring 16. Contact pin 14 is electrically insulated from body mount 1 by an insulating collar 15 and is electrically connected by spring 16 to a conductive base plate 25. In FIG. 1 an insulator 10 fits in a bore formed in mount 4 at the a-pin position. Contact pin 14 bears against insulator 10 to produce an OFF signal. In FIG. 2 a recess 30 of a diameter and depth sufficiently larger than contact pin 14 to prevent pin 14 from contacting mount 4 is formed in mount 4 at the a-pin position. Pin 14 thus projects into recess 30 until its reaches its stop position as shown, thereby producing an OFF signal. The space in recess 30 prevents electrical contact of pin 14 with mount 4. At a position on rear aperture converter mount 4 adjacent the camera body corresponding to the b-pin position there is a fixed conductive contact 9 insulated from mount 4 by an insulating collar 17. An electrical contact pin 22 projects against contact 9 at the b-pin position under a biasing effect of a conductive spring 19. Contact pin 22 is electrically insulated from mount 1 by an insulating collar 18 and is electrically connected by spring 19 to a conductive base plate 26. Contact 9 is electrically connected by a lead wire 11 to base plate 5. Base plates 25 and 26 are electrically connected by leads 27 and 28 to conventional automatic exposure control apparatus which could take the form, for example, of the arrangement disclosed in FIG. 2 of application Ser. No. 229,879 filed Jan. 30, 1981, the disclosure of which is incorporated fully herein by reference.

FIG. 3 corresponds to the case in which the rear aperture converter having a conversion ratio of 2 is inserted between an objective having its own Fmin of 16 (a-pin, ON; b-pin, ON) and the camera body to obtain a combined Fmin of 32 (a-pin, OFF; b-pin, ON), as shown by Table 1. The rear aperture converter has the same signal transmitting mechanism as in FIGS. 1 and 2 and the same parts are designated by the same reference numerals. The lens mount 2 has nothing both at the a-pin position and at the b-pin position, since ON signals appear as outputs at both a-pin and b-pin positions of the objective.

In summary, in both cases the rear aperture converter presents an OFF signal to the camera body at the a-pin position and transmits the binary signal value of the objective to the camera body at the b-pin position. Thus, when an OFF signal appears at the b-pin position of the objective, an OFF signal is presented to the camera body at the b-pin position, as illustrated in FIGS. 1 and 2. When an ON signal appears at the b-pin position of the objective, an ON signal is presented to the camera body at the b-pin position, as illustrated in FIG. 3. Thus, the rear aperture converter itself automatically compensates for the change in minimum aperture value it introduces. Thus, the rear aperture converter transmits the binary information value, i.e., bit, at the b-pin position of the objective to the camera body without change and transmits the binary information value, i.e., bit, at the a-pin position of the objective to the camera body in inverted form.

With such arrangement as has been mentioned, the minimum aperture in F-value (Fmin) of each objective is converted in the rear aperture converter having the conversion ratio of 2 into the combined Fmin of said ratio 2 so that accurate exposure control and display are possible without any special adjustment in spite of insertion of such rear aperture converter.

TABLE 1

Pin arrangement in electric contacts for transmission of Fmin signals

| Electric contact pins | | | Combined Electric contact pins | | |
|---|---|---|---|---|---|
| Fmin | a-pin | b-pin | Fmin | a-pin | b-pin |
| 16 | ON | ON | 32 | OFF | ON |
| 22 | ON | OFF | 45 | OFF | OFF |
| 32 | OFF | ON | | | |
| 45 | OFF | OFF | | | |
| (Objective only) | | | (+ Rear aperture converter having conversion ratio of 2) | | |

What is claimed is:

1. In a photographic camera having an interchangeable lens assembly with a lens mount and a camera body with a body mount engageable with the lens mount, a source of binary signals in the lens assembly having at least two bits representative of a lens characteristic, and means in the camera body for receiving the binary information, a rear aperture converter comprising:
   a first mount engageable with the lens mount;
   a second mount engageable with the body mount;
   means for transmitting from the first mount to the second mount without change one bit of the binary information; and
   means for transmitting from the first mount to the second mount the other bit of the binary information in inverted form.

2. The rear aperture converter of claim 1, in which the source of binary information comprises conductive and/or insulative areas on the lens mount representative of the minimum aperture value of the lens, the receiving means comprises contact pins on the body mount in alignment with the areas on the lens mount, the first transmitting means comprises a first contact on the first mount in alignment with one of the areas on the lens mount, a second contact on the second mount in alignment with one of the contacts on the body mount, and means for electrically connecting the first and second contacts in the converter and the second transmitting means comprises an insulative element in the second mount preventing electrical contact of the second pin with the second mount.

* * * * *